(12) United States Patent
Wang (10) Patent No.: US 9,304,002 B2
(45) Date of Patent: Apr. 5, 2016

(54) MOBILITY OBSERVATION (71) Applicant: Ting Wang, Singapore (SG)

(72) Inventor: Ting Wang, Singapore (SG)

(73) Assignee: SAP SE (DE)

( * ) Notice: Subject to any disclaimer, the term of this patent is extended or adjusted under 35 U.S.C. 154(b) by 0 days.

(21) Appl. No.: 14/314,047

(22) Filed: Jun. 25, 2014

(65) Prior Publication Data

US 2015/0377626 A1 Dec. 31, 2015

(51) Int. Cl.
*G01C 21/14* (2006.01)
*G01C 21/20* (2006.01)
*H04W 4/02* (2009.01)

(52) U.S. Cl.
CPC *G01C 21/20* (2013.01); *H04W 4/02* (2013.01)

(58) Field of Classification Search
CPC .................................. G01C 21/14; G01C 21/22
See application file for complete search history.

(56) References Cited

PUBLICATIONS

Ting Wang, An Online Data Compression Algorithm for Trajectories, International Journal of Information and Education Technology, Aug. 2013, pp. 480-487, vol. 3, No. 4.
Akinori Asahara et al., Pedestrian-movement Prediction based on Mixed Markov-chain Model, ACM, 2011, pp. 25-33.
Richard A. Becker et al., Human Mobility Characterization from Cellular Network Data, Communications of the ACM, 2013, pp. 1-8, USA.
M. De Berg et al., Computational Geometry, Springer, 2008, pp. 243-252.
Bruce J. Worton, A Convex Hull-Based Estimator of Home-Range Size, Biometrics, Dec. 1995, pp. 1206-1215, vol. 51, No. 4, JStor.
Mahmood Deypir et al., Towards a variable size sliding window model for frequent itemset mining over data streams, Computers & Industrial Engineering, 63, 2012, pp. 161-172, Elsevier Ltd.
David G. Kirkpatrick et al., The Ultimate Planar Convex Hull Algorithm?, SIAM Journal on Computing, 1983.
T. M. Chan, Optimal Output-Sensitive Convex Hull Algorithms in Two and Three Dimensions, Discrete & Computational Geometry, 1996, pp. 361-368, Springer-Verlag New York Inc.
C. Bradford Barber et al., The Quickhull Algorithm for Convex Hulls, ACM Transactions on Mathematical Software, Dec. 1996, pp. 469-483, vol. 22, No. 4.
David Avis et al., How Good are Convex Hull Algorithms?, Computational Geometry, Feb. 1996, pp. 1-36.
Timothy L. Nyerges, Locational Referencing and Highway Segmentation in a Geographic Information System, ITE Journal, Mar. 1990, pp. 27-31, vol. 60, No. 3.
N. Andrienko et al., Exploratory Analysis of Spatial and Temporal Data, 2006, Springer Berlin, Germany.
International Transport Forum, Setting the Scene, Improving Reliability on Surface Transport Networks, 2010, pp. 31-33, OECD.
Wei Gao et al., Fine-Grained Mobility Characterization: Steady and Transient State Behaviours, ACM, 2010, pp. 61-70, USA.
D. Pareek, Business Intelligence for Telecommunications, CRC Press, 2006, vol. 2.

(Continued)

*Primary Examiner* — James Trammell
*Assistant Examiner* — Michael D Lang
(74) *Attorney, Agent, or Firm* — Horizon IP Pte. Ltd.

(57) ABSTRACT

Representative implementations provide devices and techniques for observing the movement of one or more objects over a duration of time. Collected locational data of the objects is grouped according to a plurality of sliding time intervals having a variable length. The data is converted to one or more geometric representations, which are representative of object movement during a time interval. Movement patterns of the objects may be determined based on the properties of the geometric representations.

18 Claims, 8 Drawing Sheets

(56) References Cited

PUBLICATIONS

Fosca Giannotti et al., Trajectory Pattern Mining, ACM, 2007, pp. 330-339, USA.

Lin Liao et al., Learning and Inferring Transportation Routines, Artificial Intelligence, Feb. 24, 2007, pp. 311-331, vol. 171, Elsevier B.V.

Erdal Cayirci et al., User Mobility Pattern Scheme for Location Update and Paging in Wireless Systems, IEEE Transactions on Mobile Computing, Jul.-Sep. 2002, pp. 236-247, vol. 1, No. 3.

Cynthia A. Patterson, Challenges in Location-Aware Computing, IEEE, 2003, vol. 2, No. 2.

Yongmei Lu et al., Pervasive location acquisition technologies: Opportunities and challenges for geospatial studies, Computers, Environment and Urban Systems 36, 2012, pp. 105-108, Elsevier Ltd.

MOBILITY OBSERVATION

BACKGROUND

Over the last few decades, with the increasingly accurate positioning services (e.g., GPS, AIS, Mobile Phone Triangulation, RFID/Wi-Fi tracking, etc.) and the decreasing price of their deployment, locational data is becoming pervasive in our daily lives and scientific researches. Either indoor or outdoor, it is not difficult to obtain the trace, the velocity, and even the acceleration of any moving entity (referred to as an "object" herein) of interest with proper equipment and infrastructure. Massive data have been collected in various research projects since the early 90's. As part of the "big data regime," interest in locational data has recently grown even more rapidly due to advancement in database technology and data mining techniques.

When locational data is coupled with time-stamps, it becomes spatial-temporal data, having both space (spatial) and time (temporal) information. The timely sequence of locations of an object defines its trajectory. Trajectories of objects are widely used in a variety of business and public sector applications, such as traffic modeling and supply chain management. More often, they are important sources for mobility observation, a process in which information related to objects' movement, such as patterns, correlations, and clusters, can be discovered.

While pervasive positioning technologies provide opportunities to access vast amount of locational data and test these solutions, they also raise challenges due to the sparse nature of data collection strategies, the diverse density of the data, and technical issues associated with the accuracy of the data. The enormous volume of data can easily overwhelm human analysis. This is sometimes solved by a compression algorithm, for example. However, source data can often be inaccurate and inconsistent.

In general, existing mobility observation techniques can be classified as one of the following three categories:
State Based: states are defined by (time, location) combinations. The trajectory of an object is a sequence of states and the transitions among them. Markov-chain and other related models can be used to study the underlying patterns.
Similarity Based: similarity between trajectories can be calculated from the 3-dimensional or 4-dimensional proximity of the data points. It is then usually used to define clusters or places of interest.
Density Based: in large scale problems, importance of locations can simply be reflected by the density of data points in that area.

However, these solutions all have weaknesses when dealing with different data sets. For example, if the data points are scarce (either spatially or temporally), the similarity based solution may produce inaccurate results, because data points for similar trajectories may be far apart. On the other hand, for high frequency locational data (e.g. continuously generated by positioning sensors), the state based approach could be overwhelmed by the enormous number of states. Compression algorithms are often needed to pre-process the data and could result in inefficiency. Also, the density based solutions will often need the timely frequency of data points to be normalized; otherwise their density would not reflect the true distribution of the moving objects.

Moreover, it is not common for existing solutions to deal with the error in the location detections, which in fact could be crucial to the correctness of the results. Hence, current solutions generally do not have the ability to adapt to different source locational data, and to extract as much useful information from the data.

SUMMARY

A framework for tracking movement of one or more objects is described herein. In accordance with one aspect, locational data for objects is collected over a duration. The locational data may be grouped according to a plurality of sliding time intervals of variable length. The locational data may further be converted into one or more geometric representations, which are representative of object movement during a time interval. Movement patterns of the objects may be determined based on the properties of the geometric representations.

With these and other advantages and features that will become hereinafter apparent, further information may be obtained by reference to the following detailed description and appended claims, and to the figures attached hereto.

BRIEF DESCRIPTION OF THE DRAWINGS

The Detailed Description is set forth with reference to the accompanying figures. In the figures, the left-most digit(s) of a reference number identifies the figure in which the reference number first appears. The use of the same reference numbers in different figures indicates similar or identical items.

DETAILED DESCRIPTION

Various devices, systems, and techniques provide for observing the movement of one or more objects over a duration of time, according to example implementations. For ease of discussion, the disclosure describes the various techniques with respect to objects such as mobile phones and other mobile communications devices (and the users carrying them). However, the descriptions are also applicable to other applications, such as animal movements or migrations, traffic patterns, consumer behavior, and the like. The techniques described may be applied in various computing environments, networks, other forms and types of computing models, and the like.

In an implementation, collected locational data of mobile objects is grouped according to a plurality of sliding time intervals having a variable length. The data is converted to one or more geometric representations, which are representative of object movement during a time interval. Properties of the geometric representations are stored in a multi-dimensional array, and may be analyzed to determine movement patterns of the objects. Having the properties stored in the multi-dimensional array (such as a data cube, for instance) facilitates the mining and/or analysis of the information, and facilitates the use and application of the data.

In one example, the data structure is a three-dimensional data cube, which uses a sliding time window (e.g., time interval) with variable window size to store trajectory-related data, such as speed, distance traveled or energy consumed. In another example, the data cube stores the size of a convex hull polygon that is constructed from the trajectory information of the locational data.

In one implementation, the data is used to determine one or more "active areas" of an object. The active areas represent periods of limited travel, where the object is substantially spatially static and assumed to be "doing something" rather than moving from location to location. For example, it may be that the object (e.g., person) is sleeping, eating a meal, working, or doing some other activity that keeps them in the same place for a while.

In the implementation, the active areas are determined based on the size of a geometric representation formed from the locational data, and may also be determined based on the shape of the geometric representation. For instance, in general, if the size of the area of the geometric representation is smaller, the likelihood increases that the data represents an active area for the object. As the area of the geometric representation increases, the likelihood of the data representing an active area decreases.

The discussion herein is intended to illustrate example components and techniques which may be utilized, but the examples described are not intended to be limiting. In various implementations, fewer, alternate, or additional components may be included to perform various portions of described techniques while remaining within the scope of the disclosure.

Advantageous features of the disclosed techniques, devices and systems include, but are not limited to: 1) error tolerance for object mobility observation; 2) the techniques do not assume or require that the locational data is evenly distributed in time or space; 3) user privacy is protected while their trajectory is being studied (users' actual location information is hidden from their behavior; 4) the data structures used to store locational data are scalable and adjustable (it is possible to zoom-in for more details or zoom-out to see the "big picture"); 5) the data structures used are easily accessible and do not add much overhead to analytical tasks; and 6) the systems and techniques provide the ability to compress data in size when needed.

Figure 1:
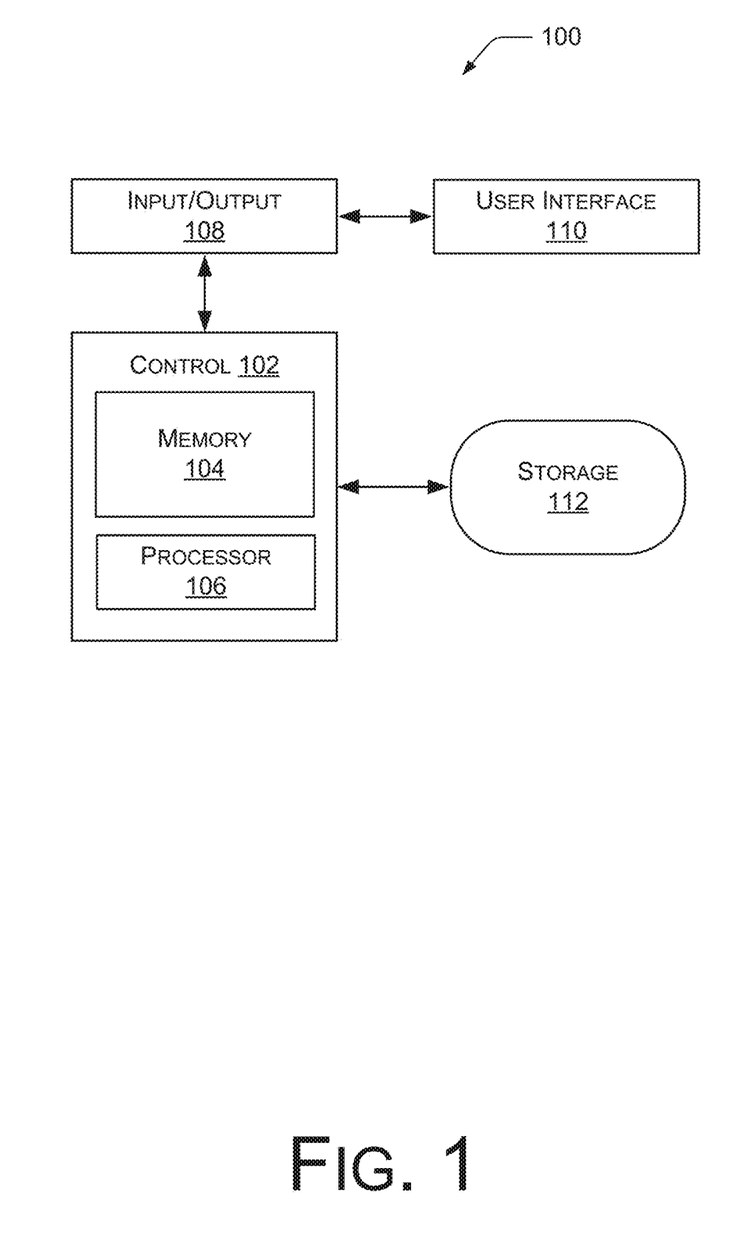
FIG. 1 is a block diagram of an example system, wherein the techniques and devices discussed herein may be implemented.

FIG. 1 shows an example of a system 100 wherein the techniques and devices discussed herein may be implemented. In the example, the system 100 uses a control module 102, for example, to perform computational, analytical, and control functions for the system 100. As shown in FIG. 1, the control module 102 may include a memory 104 and one or more processors 106, as are described further below. In various implementations, the system 100 includes an input/output (I/O) module 108, a user interface (UI) 110, and may also include a storage component 112.

In an implementation, the input/output module 108 receives locational data of an object over a duration of time. The duration may be hours, days, weeks, months, years, or the like. The locational data may be collected from mobile communications device of a user, for instance (e.g., a "keep-alive" beacon, a phone call, a sms, or a data connection etc.). In an implementation, the locational data comprises spatial-temporal data having the form of (time, location). In one example, the locational data comprises a timestamp and a location of a base station that a mobile communication device is connected to.

In another example, the locational data does not include global positioning satellite (GPS) data or signal triangle information regarding the objects. Accordingly, the locational data may be less accurate (e.g., hundreds of meters off, for instance) when it is received as raw data by the input/output module 108 of the system 100. Further, the timely frequency of a single device could be quite low (e.g., as low as 1 or 2 entries per hour). In an implementation, the memory 104 collects and stores the locational data received by the input/output module 108.

Figure 2:
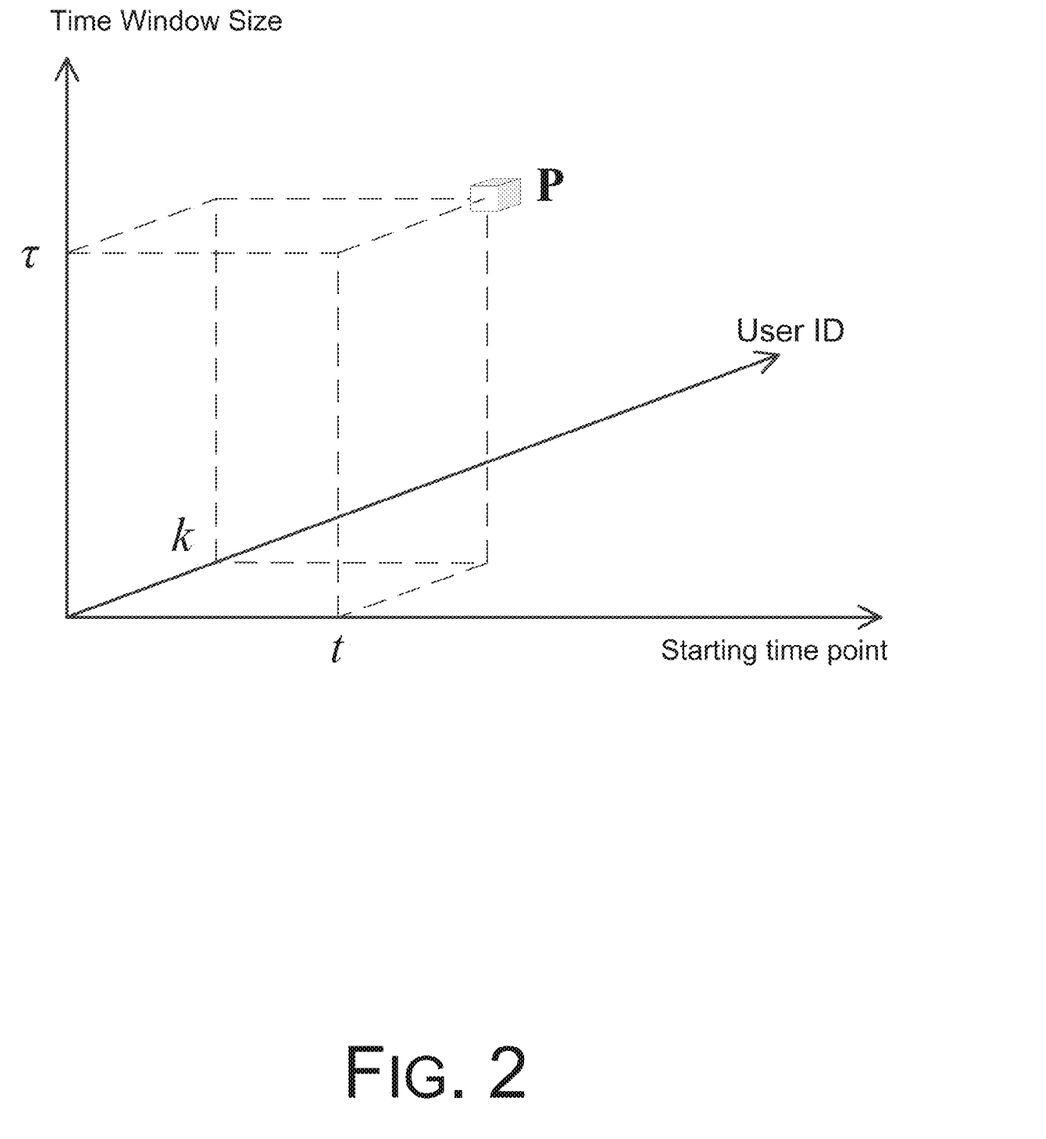
FIG. 2 is an illustration showing an exemplary sliding time window.

In an implementation, the control module 102 (using the processor 106) is arranged to group the locational data according to a plurality of sliding time intervals (i.e., time windows) of variable length. To make sense of the data, smaller time windows, as shown in FIG. 2, with less data, could be more meaningful and simplify the process of analysis. For example, the time intervals include portions of the duration. Thus, the time duration is divided up by the time intervals, which may or may not overlap. Each time interval includes a portion of the locational data associated with that time interval. In an implementation, there may be some redundancy of locational data among adjacent time intervals. For example, the locational data may be smoothed by selecting start times and lengths of the time intervals such that the time intervals overlap.

Referring to FIG. 2, in an implementation, the sliding time intervals have the form of $(t, t+\tau)$, where t represents the start time of the time interval and $(t+\tau)$ represents the length (e.g., size) of the time interval. In the implementation, $\tau$ includes a variable based on a speed of the objects and/or a frequency of changes in a direction of travel of the objects. For example, if an object moves swiftly and changes direction frequently (e.g. a bird, a soccer player, or a car on empty city streets) small time windows are more appropriate. On the other hand, for slow and constant objects (e.g. like an elephant, a pedestrian, or a car in heavy traffic) larger time windows could be adequate to show the status and changes of the object. In various implementations, the length $\tau$ of the time window is selected and varied based on the locational data set and the granularity or scale (e.g., desired level of detail) at which it is to be analyzed. In the various implementations, the value for $\tau$ may be selected by user input, algorithm, programmed pattern, or the like.

In some cases, the objects' movement may not be understood or predictable before the start of an observation. It could also be the case that the speed and mode of movement includes changes, such as those of the car in the previous examples. Therefore, a variable window size $\tau$ is used and is set to different values to capture object's movement in different scales. Additionally, a variable window size $\tau$ provides the freedom to tune the "detail level" of observation, in which more details are revealed with smaller values of $\tau$ and the bigger picture is shown with larger values of $\tau$.

Referring to FIG. 2, in an implementation, a time window is arranged to "slide" forward as time evolves. For example, the control module 102 may regroup the locational data based on a new set of time intervals with different start times and/or different time lengths. Since trajectory data is spatial-temporal, sliding time windows help to understand the "temporal" property. A single time window may show a static location of the object in the particular time interval, while a series of sliding time windows demonstrate how the object is moving around over time. In an implementation, i continuous sliding time windows is denoted as:

$$\{(t_1, t_1+\tau), (t_2, t_2+\tau), \ldots, (t_i, t_i+\tau), \ldots\}.$$

For convenience of discussion, the amount that the sliding window advances, which is represented by:

$$t_\Delta = t_2 - t_1 = t_k - t_{k-1}$$

is a constant. In various implementations, the amount that the sliding time window advances may not be a constant, and may be controlled by an algorithm, a pattern, user input, or the like.

In an implementation, to avoid loss of information, the sliding advance value $t_\Delta \leq \tau$, otherwise data between two consecutive time windows may not be captured. In one implementation, the sliding time windows overlap if $t_\Delta < \tau$, and do not overlap if $t_\Delta = \tau$. Overlapping generally means redundancy in the data to be analyzed. In some cases overlapping could result in larger data size and more processing time, but it can also be a smoothing technique, able to avoid sudden "jumps" between the time windows. In one implementation, the sliding advance value is set so that $t_\Delta \cong 1/3\tau$ (e.g., $\tau=3$ hr and $t_\Delta=1$ hr, etc.). In the implementation, this sliding advance value gives a smooth transition among the time windows. In other implementations, other sliding advance values are used to provide the smoothing desired.

Figure 3:
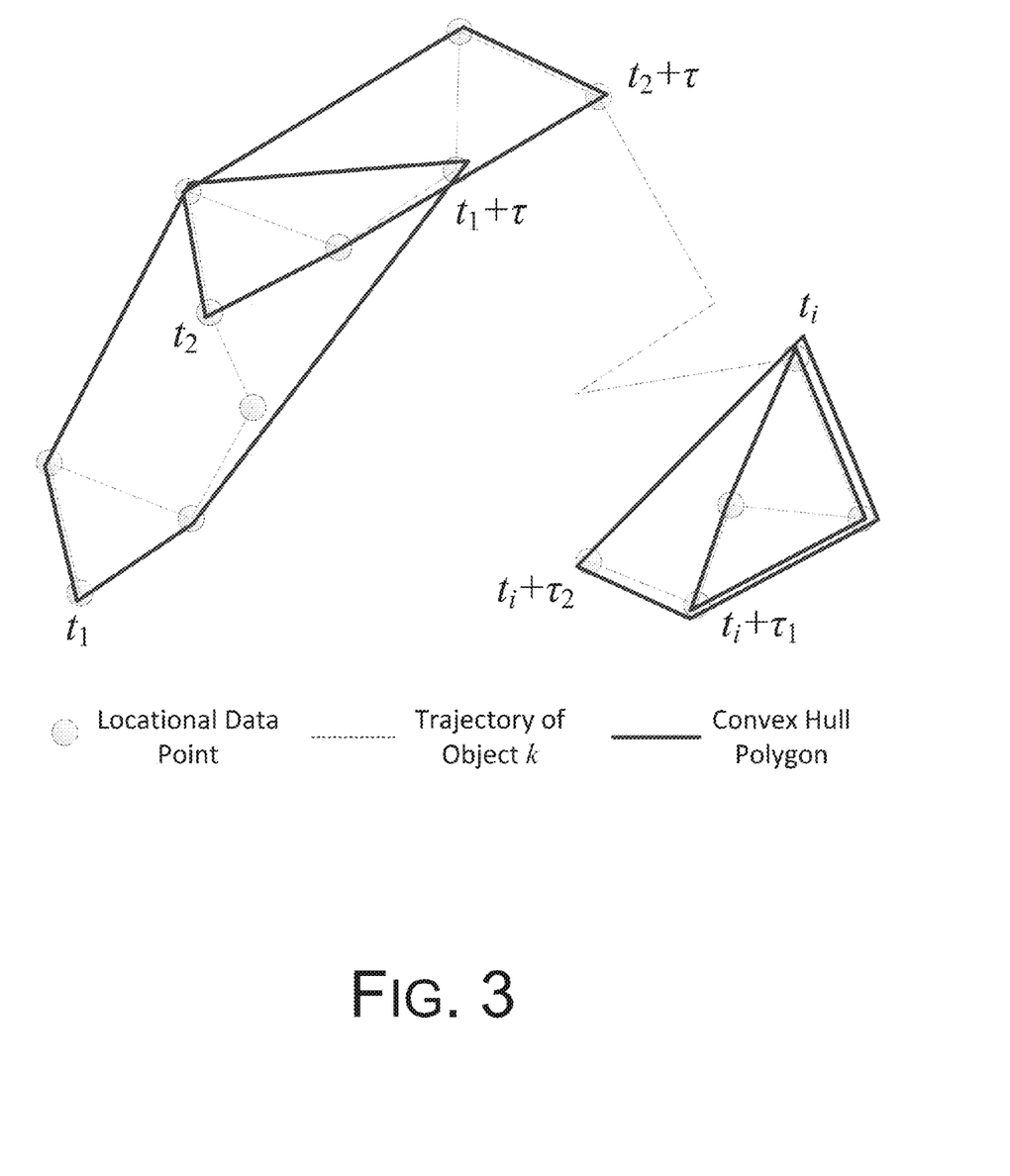
FIG. 3 is a block diagram illustrating an example conversion of locational data points to a geometric representation of the data points.

Referring to FIG. 3, in an implementation, the control module 102 is arranged to iteratively convert the locational data into one or more geometric representations of the locational data per object, per time interval. In the implementation, the geometric representations are representative of the object's movement during each time interval. For example, in one implementation, the control module 102 iteratively processes the locational data via a technique, such as a convex hull algorithm, by object, by time length, and by start time, to convert the locational data into polygons, or other polytopes. In the example, the size and/or the shape of the geometric representations are representative of object movement during the time interval. In other implementations, the control module 102 uses other algorithms to convert the locational data (e.g., gravity center, density data, etc.).

For example, with a gravity center technique, in each time window, the average position of the locational points will be the gravity center of this particular window. With the changing window size, the gravity center location is a "moving average" of the locational points, and a movement pattern can thus be observed. For example, if the gravity center does not change its location in some time windows with the same value of t but different values of τ, it means the object is most likely stationary, or moving in a rather small area.

Further, with a density data technique, for some dataset, the mobility of an object can be observed from the density of the data points. Using this technique, the system 100 is able to observe the change in the activeness with different window lengths, and identify how and why the object becomes more active or more stationary.

Figure 4:
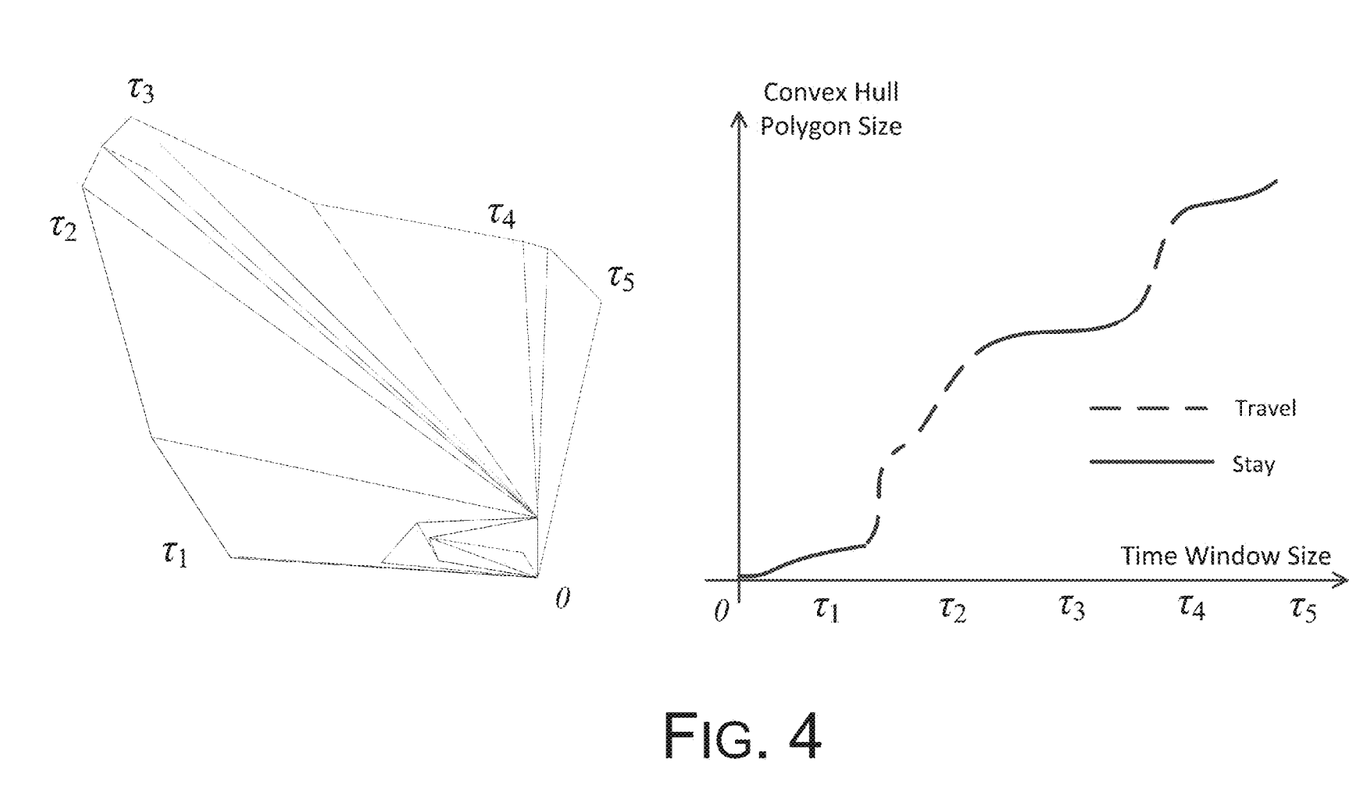
FIG. 4 is an exemplary block diagram graphically illustrating the evolution of a series of polygons based on time intervals with a same start point and varying time lengths.

As shown in FIG. 4, the geometric representations (e.g., polygons) formed based on a time interval can indicate that an object is travelling. In one case, a polygon with a small size, but a long perimeter and large edge length variation is an indication of a travelling object. The long edge of this kind of polygon shows that the object is travelling during the time window, and the short edges give information about stops, destinations, and the starting point of travel. Often, there are few data points along a longer edge to show the route of travel, and the speed of travel may not be apparent at specific points along the way (although distance travelled during the time interval may be more apparent).

Also, polygons with a large size can be an indication that the object is travelling. It can be seen as a large active area, in which the object goes to multiple places, for example. Here, the dimension of the length τ can be useful. With a variable time window size, it is possible to determine when and where an object starts to travel. FIG. 4 shows how the polygon size evolves with the values of interval length τ, for a fixed starting point at t=0. The steep slopes in the figure indicate "travelling," while the flatter portions indicate "staying."

A convex hull is of a set of locational points in the Euclidean plane or Euclidean space which is the smallest convex set that contains the set. The process of finding convex hulls finds practical application in pattern recognition, image processing, statistics, GTS and static code analysis by abstract interpretation. In particular, a convex hull algorithm may be used to study home range of wild-life animals, to study human mobility with a relationship to social behavior, or the like. In an implementation, adding a sliding window with variable size to a convex hull algorithm allows a timely change of the convex hull to be studied, and for mobility patterns to be observed.

In computational geometry, numerous algorithms are proposed for computing the convex hull of a finite set of points, with various computational complexities. Computing the convex hull means that a non-ambiguous and efficient representation of the required convex shape is constructed. The complexity of the corresponding algorithms is usually estimated in terms of n, the number of input points, and h, the number of points on the convex hull.

The complexity of finding a convex hull as a function of the input size n is lower bounded by $\Omega(n \log n)$. However, the complexity of some convex hull algorithms can be characterized in terms of both input size n and the output size h (the number of points in the hull). Such algorithms are called output-sensitive algorithms. They may be asymptotically more efficient than $\Omega(n \log n)$ algorithms in cases when $h=O(n)$.

A number of algorithms are known for the three-dimensional case, as well as for arbitrary dimensions. For a finite set of points, the convex hull is a convex polyhedron in three dimensions, or in general a convex polytope for any number of dimensions, whose vertices are some of the points in the input set. Its representation is not so simple as in the planar case, however. In higher dimensions, even if the vertices of a convex polytope are known, construction of its faces is a non-trivial task, as is the dual problem of constructing the vertices given the faces. The size of the output may be exponentially larger than the size of the input, and even in cases where the input and output are both of comparable size, the known algorithms for high-dimensional convex hulls are not output-sensitive both due to issues with degenerate inputs and with intermediate results of high complexity.

Using a sliding time window and a convex hull algorithm, the control module 102 transforms the trajectory of an object (i.e., the locational data) to a series of polygons, each corresponding to the object's movement in a particular time window. For example, the geometric representations include convex polyhedrons whose vertices include at least a portion of the locational data received by the input/output module 108.

Figure 5:
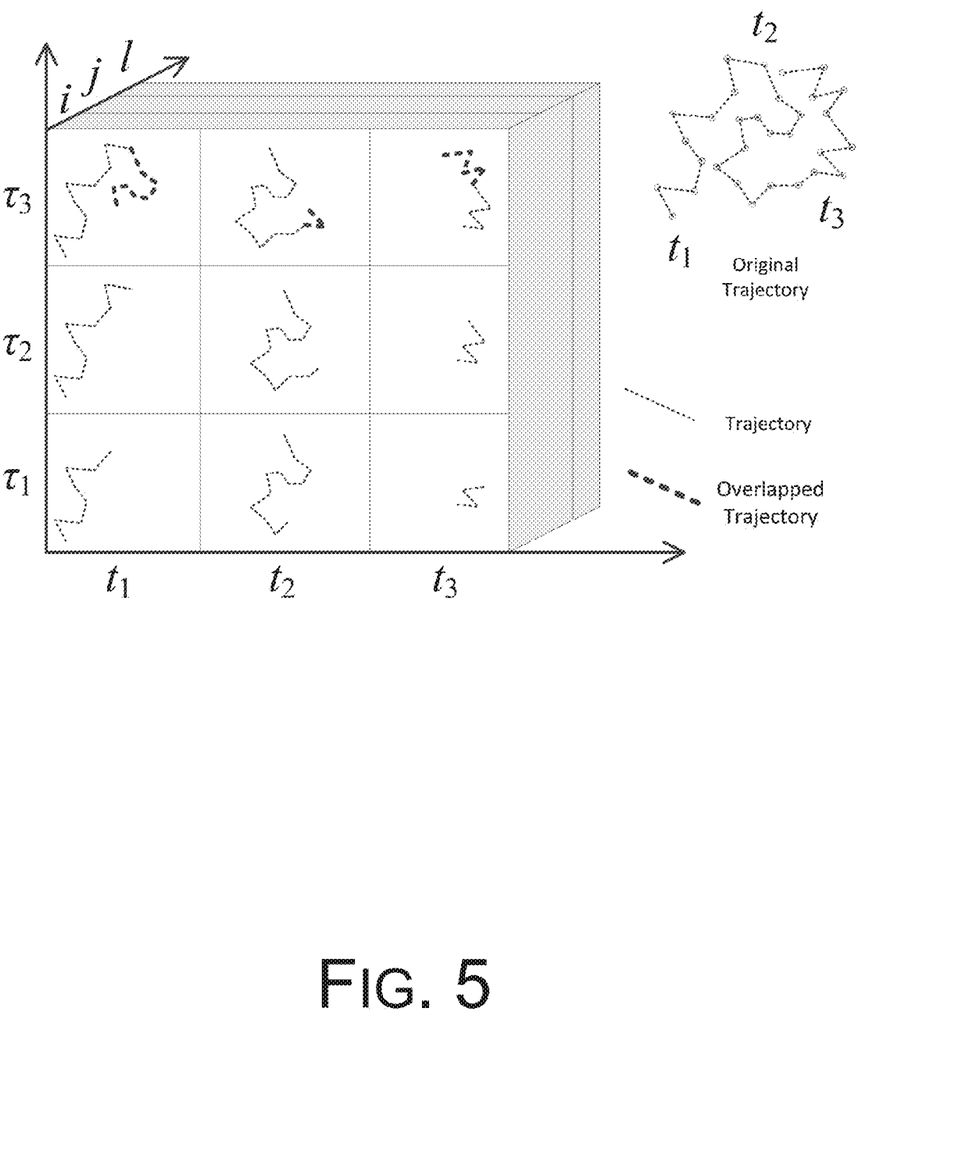
FIG. 5 is a block diagram of an example data cube, showing example field information.

Referring to FIG. 5, in an implementation, storage device 112 and/or the memory 104 is arranged to store one or more properties of the geometric representations in fields of a multi-dimensional array. For example, in one case, the storage device 112 stores one or more edge lengths, a number of vertices, a number of edges of the polygons, or the like, in the fields of the three-dimensional data structure. In the implementation, each field of the array corresponds to the object, a start time for a time interval, and a length of the time interval.

In the context of the disclosure, a data cube is a three (or higher) dimensional array of values, used to describe a time series of data. A data cube can be considered a generalization of a high dimensional spreadsheet formed by cells (i.e., fields). A cell corresponds to one particular value (in this case $\{k, t, \tau\}$) in each dimension.

In an implementation, a data cube is a data structure to store the trajectory information of the objects, in one or more of various forms. A certain property of the moving object, denoted as P, can be summarized to the object ID k, the time window starting point t, and the window size $\tau$, as shown in FIG. 5. In an implementation, $\{k, t, \tau\}$ forms the three dimensions of the cube, and stores the polygons generated by the control module 102 for each corresponding object, in each corresponding time window. In an implementation, the multi-dimensional data cube stores the sizes of the geometric representations (e.g., polygons, polyhedrons, etc.) of the collected locational data. In alternate implementations, the fields of the data cube may store one or more of speed, location, acceleration, etc., of the object as well.

Figure 6:
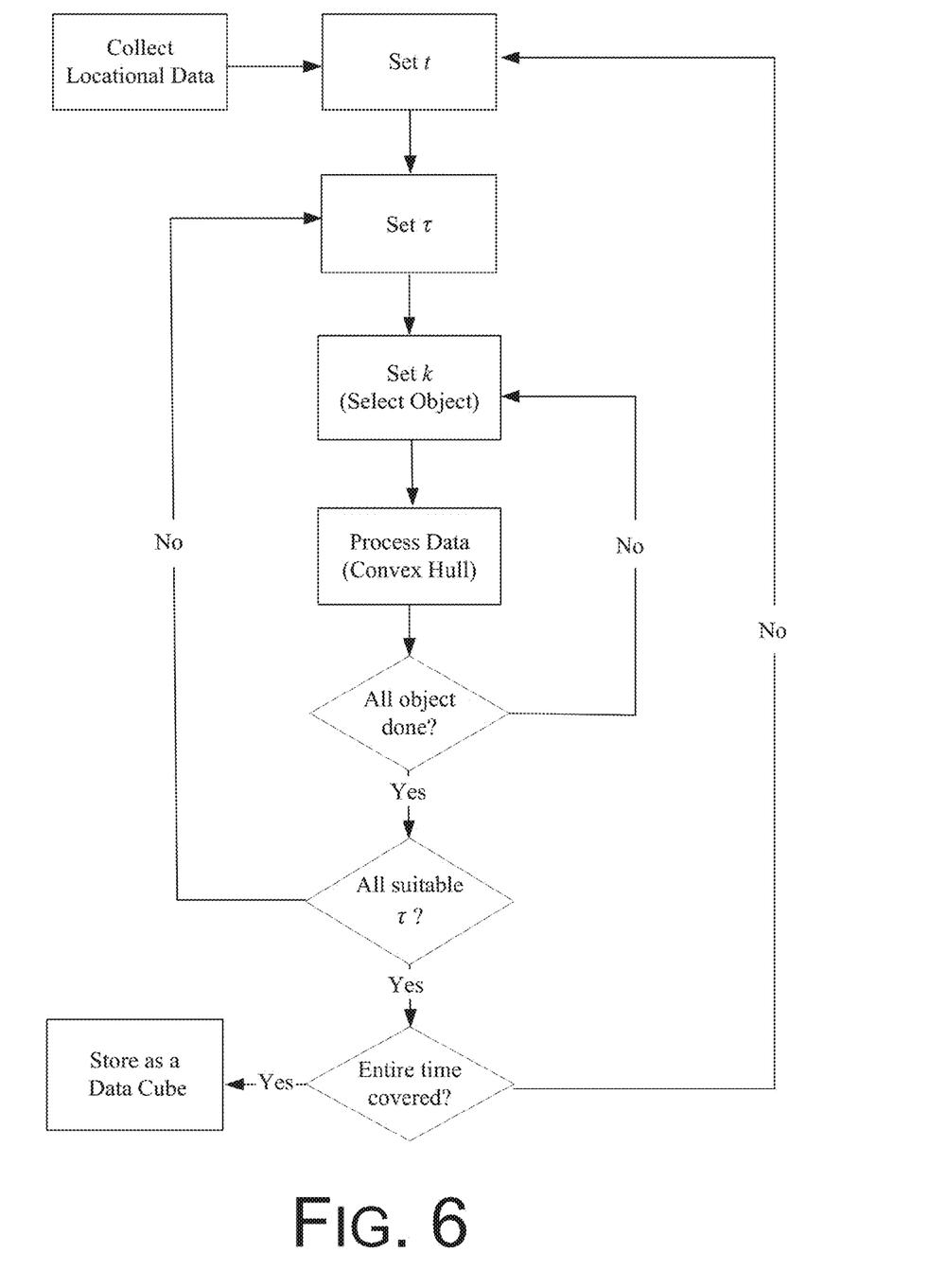
FIG. 6 is a flow diagram of an example algorithm for processing locational data.

FIG. 6 depicts the data flow of conversion, and how the data cube is constructed. For example, the conversion includes iteratively converting the locational data into one or more geometric representations of the locational data per time interval (e.g., per time length, per start time), per object, where the geometric representations are representative of object movement during each time interval. As described, in various implementations, a value of the time length $\tau$ of the time interval varies with subsequent iterations of time length $\tau$, based on a desired observation scale or desired level of detail.

In an implementation, the control module 102 is arranged to convert the locational data into one or more geometric representations based on a time interval of a first length $\tau$, and to convert the locational data into one or more other geometric representations based on time intervals of subsequent lengths $\tau$, for a set of predetermined lengths $\tau$. In alternate implementations, the lengths $\tau$ are determined based on the desired scale or granularity of observation.

In an implementation, the control module 102 is arranged to convert the locational data into one or more geometric representations for the set of predetermined lengths $\tau$ based on a first interval start time t, and to convert the locational data into one or more other geometric representations for the set of predetermined lengths $\tau$ based on subsequent interval start times t, for a set of predetermined interval start times t. In various implementations, the lengths $\tau$ and start times t determine the sliding time intervals or windows, which may overlap if desired. For example, the control module 102 is arranged to regroup the locational data according to subsequent sets of sliding time intervals based on iterations of the set of predetermined lengths $\tau$ and the set of predetermined interval start times t.

As summarized in FIG. 6, the system 100 is arranged to receive locational data for a plurality of objects over the duration of time, to convert the locational data into geometric representations iteratively by object k, length $\tau$ of time interval, and start time t, and to store one or more properties of the geometric representations in fields of a three dimensional data structure, the three dimensions of the data structure corresponding to an object id k, a start time t for a time interval, and a length $\tau$ of the time interval.

In an implementation, the control module 102 is arranged to determine movement patterns of the object, based on properties (such as sizes, for example) of the geometric representations stored in the multi-dimensional array. For example, in one implementation, the length of an edge of a polygon corresponds to a distance traveled by an object during a time interval. In an implementation, a geometric representation having a smaller size represents less object movement and a geometric representation having a greater size represents more object movement. In an alternate implementation, the control module 102 determines movement patterns of an object based on analyzing a series of temporally consecutive geometric representations for the object. For example, temporally consecutive (i.e., adjacent or overlapping, same or different start times and/or time lengths) polygons may be analyzed together to determine the movement of an object over one or more time intervals.

In another implementation, the control module 102 is arranged to determine an active area for an object based on a size of an area of one or more of the geometric representations, without regard to locational data density. In the implementation, the active area corresponds to a region where the object movement is reduced below a threshold value for at least a predetermined length of time.

For example, as part of movement observation, the control module 102 determines the existence of an active area of the object, (i.e. where the object stops and does something). If the object is a human, an active area might reflect where he or she lives, works or does shopping. If the object is a mobile sensor, it could show where is the place that the sensor is trapped, or has more data to process. If the object is an animal, the active area might demonstrate the living area distribution of the animal, which would be of interest for some zoologists.

In conventional mobility observation algorithms, finding an active area is usually done from a signal density perspective, that is, places with denser locational records are considered as active areas. But the effectiveness of this kind of solution depends on the source locational data quality. If the object does not sense its location frequently, there may not be a clear difference in signal density between an active area and a non-active area. Moreover, it could be difficult to find out the boundary of the active area from the signal density. To use these solutions, pre-defined area shapes (such as grids or hexagons) can be used to calculate the density. Thus the exact location of the active area can hardly be determined.

Figure 7:
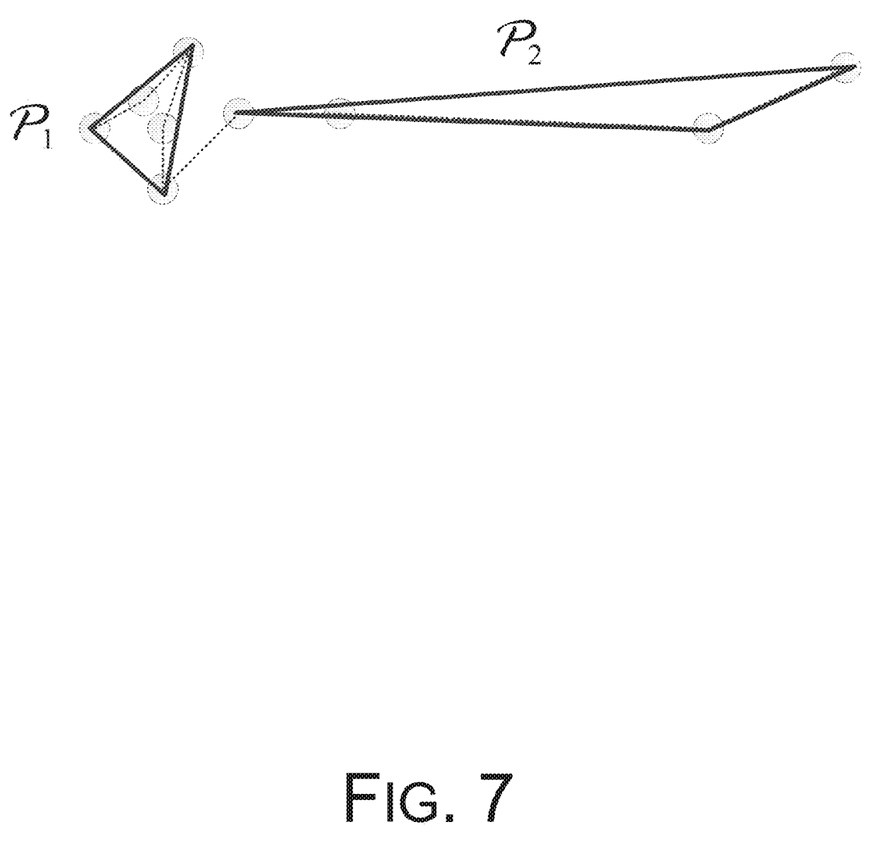
FIG. 7 is a block diagram graphically illustrating two sample polygons having small area sizes.

In an implementation, using a convex hull algorithm with a data cube, the area size of a polygon includes the area that the object has covered in the corresponding time window. When all of the time windows have a unit size, i.e., consider only $\{t, k\}$ dimensions for a constant $\tau$ in the data cube generated by the control module 102, smaller polygons indicate the fact that the object spend the same amount of time within a smaller area. This could be a good indication of active area, with same time window length, but less movement, as shown in FIG. 7 by $P_1$. Here, it has nothing to do with the density of the signal, because the quantity of data records found within the polygon is not considered, but the boundary and size of the polygon gives the desired information. In this way, an active area of any shape can be determined.

Also as shown in FIG. 7 by $P_2$, there can be extreme cases, where area size could be small even if the location records are far apart. To rule out this kind of exception, a secondary polygon property can be considered, such as number of edges, polygon perimeter, and edge length variance or deviation. For example, if the polygon has few edges with long perimeter and large length deviation, it means the polygon's shape is similar to $P_2$, and thus is likely not an active area.

Another special case is when the polygon size is 0. This means only one or two locational records are found in the time window. In an implementation, no active area is determined in this case. In this case, the time window length τ may be extended so that more data points show up in the new time window, and a better determination can be made. Accordingly, in various implementations, threshold values may be set (movement is reduced below a threshold value, for instance) to determine a minimum polygon area size (300 m², for example) for active area determination, within a predetermined length of time, the interval length τ. In one example, the threshold values used may include minimum data points in the time interval, or the like.

In an implementation, the control module 102 may be arranged to cluster the objects based on an analysis of their mobility patterns with regard to the time intervals observed. For example, the objects' (e.g., persons') work, social, or other mobility behavior may be similar to that of many other objects, and the objects can be grouped together based on the shared behaviors.

As discussed above, in an implementation, a large polygon size means the object is traveling. Looking at the polygon sizes for different times of the day can show that some objects have mobility peaks in morning and evening rush hours, when they are likely going to work and coming home. On the other hand, when the objects stop moving and stay put, their polygon sizes reduce. The polygon sizes can show how the objects stay at work or have a lunch break in the middle of the day, for instance.

In one example, six clusters for objects are identified:
Regular work is far away from home
Regular work is close to home
Almost stationary objects (home workers, etc.)
All-day travelers (sales persons, etc.)
All-day travelers with a lunch break (drivers, etc.)
Long-distance night-travelers (taxis, etc.)

Significantly, the system 100 is able to classify the objects (e.g., persons) based on their behavior, despite the inaccuracy and inconsistency of the source locational data. Moreover, this solution has the advantage that the data does not need to show the exact location of the user to study his or her lifestyle. The polygon size is irrelevant to the actual location. In this way, users' privacy could be preserved and confidential information would not be leaked in the observation.

In an implementation, user interface 110 is arranged to display the movement patterns (including the active areas, if determined) to a user, as determined by the control module 102. For example, the movement patterns can be displayed via a user interface of a display device (e.g., display of a mobile device, tablet, computer display screen, etc.) or the like. In alternate implementations, the movement patterns may be displayed on a map interface, which may show a specific geographic location or may show general relative positions. Further, the movement patterns may be transmitted to one or more remote locations for application (e.g., for traffic control, emergency response, etc.).

Portions of the subject matter of this disclosure can be implemented as a system, method, apparatus, or article of manufacture using standard programming and/or engineering techniques to produce software, firmware, hardware or any combination thereof to control a computer or processor (such as processor 106, for example) to implement the disclosure. For example, portions of an example system 100 may be implemented using any form of computer-readable media (shown as memory 104 and storage 112 in FIG. 1, for example) that is accessible by the processor 106. Computer-readable media may include, for example, computer storage media and communications media.

Computer-readable storage media includes volatile and nonvolatile, removable and non-removable media implemented in any method or technology for storage of information such as computer-readable instructions, data structures, program modules or other data. Memory 104 is an example of computer-readable storage media. Storage 112, which may include network or cloud storage, for example, is another example of computer-readable storage media. Additional types of computer-readable storage media that may be present include, but are not limited to, RAM, ROM, EEPROM, flash memory or other memory technology, CD-ROM, digital versatile disks (DVD) or other optical storage, magnetic disks or other magnetic storage devices, or any other medium which may be used to store the desired information and which may accessed by the processor 106.

In contrast, communication media typically embodies computer readable instructions, data structures, program modules, or other data in a modulated data signal, such as a carrier wave, or other transport mechanism.

While the subject matter has been described above in the general context of computer-executable instructions of a computer program that runs on a computer and/or computers, those skilled in the art will recognize that the subject matter also may be implemented in combination with other program modules. Generally, program modules include routines, programs, components, data structures, and the like, which perform particular tasks and/or implement particular abstract data types.

Moreover, those skilled in the art will appreciate that the innovative techniques can be practiced with other computer system configurations, including single-processor or multi-processor computer systems, mini-computing devices, mainframe computers, as well as personal computers, hand-held computing devices, microprocessor-based or programmable consumer or industrial electronics, and the like. The illustrated aspects may also be practiced in distributed computing environments where tasks are performed by remote processing devices that are linked through a communications network. However, some, if not all aspects of the disclosure can be practiced on stand-alone computers. In a distributed computing environment, program modules may be located in both local and remote memory storage devices.

Figure 8:
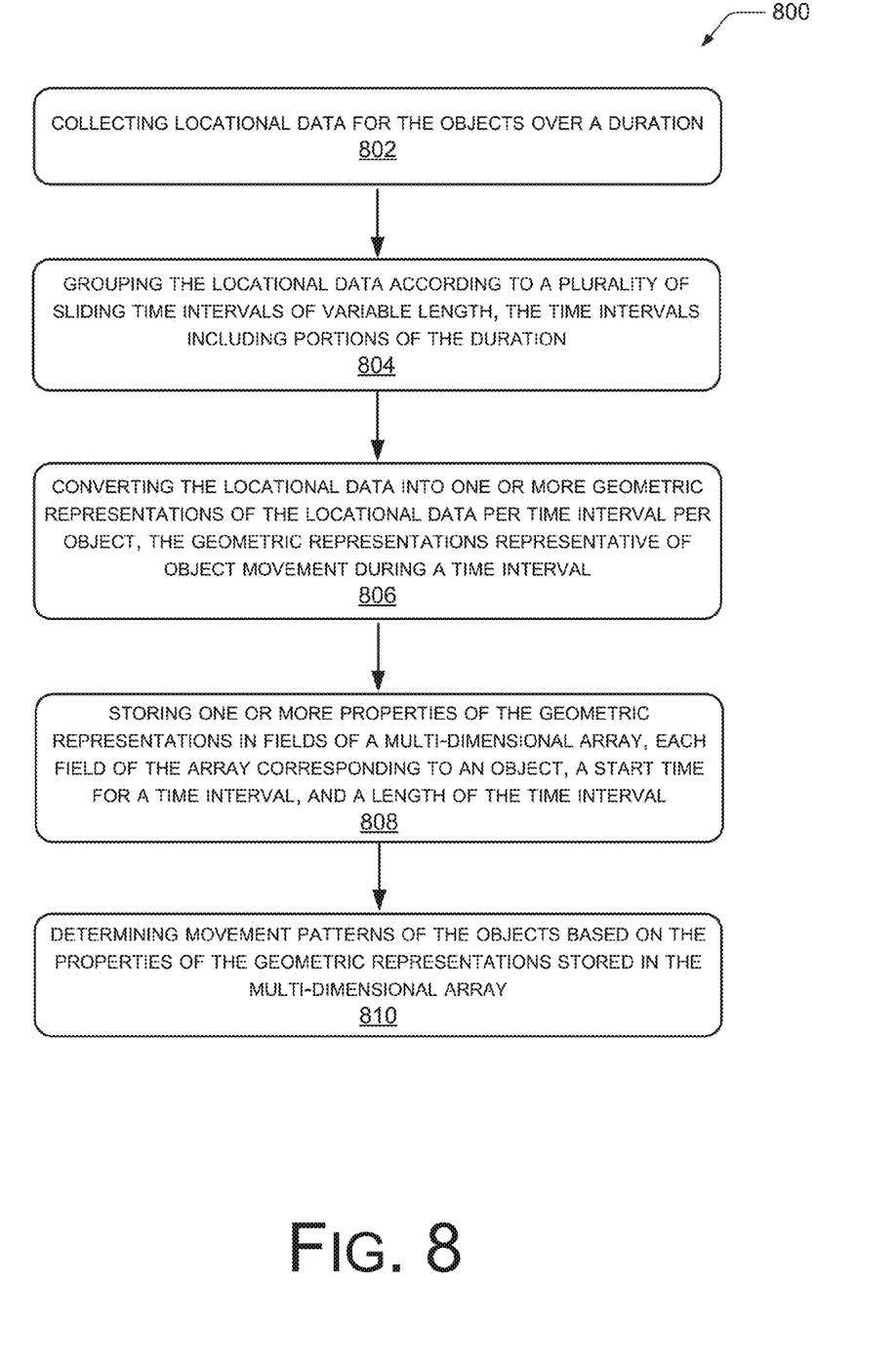
FIG. 8 is a flow diagram illustrating an example process for observing and analyzing the movements of one or more objects over a duration of time.

FIG. 8 is a flow diagram illustrating an example process 800 for observing the mobility of one or more objects. The process 800 is described with reference to FIGS. 1-7.

The order in which the process is described is not intended to be construed as a limitation, and any number of the described process blocks can be combined in any order to implement the process, or alternate processes. Additionally, individual blocks may be deleted from the process without departing from the spirit and scope of the subject matter described herein. Furthermore, the process can be implemented with any suitable components, or combinations thereof, without departing from the scope of the subject matter described herein.

At block 802, the process includes collecting locational data for the objects over a duration of time. In an example, the locational data comprises spatial-temporal data having the form of (time, location). At block 804, the process includes grouping the locational data according to a plurality of sliding time intervals of variable length, the time intervals including portions of the duration. For example, the time intervals may overlap, giving redundant data for smoothing. In one implementation, the sliding time intervals have the form of (t, t+τ), where t represents the start time of the time interval and (t+τ) represents the length of the time interval, and wherein τ comprises a variable based on a speed of the objects and/or a frequency of changes in a direction of travel of the objects.

At block 806, the process includes converting the locational data into one or more geometric representations of the locational data per time interval per object, the geometric representations are representative of object movement during a time interval. For example, the geometric representations may include polygons, polyhedrons, other polytopes, or the like.

At block 808, the process includes storing one or more properties of the geometric representations in fields of a multi-dimensional array, such as a data cube. Each field of the array corresponds to an object ID k, a start time t for a time interval, and a length τ of the time interval. At block 810, the process includes determining movement patterns of the objects based on the properties of the geometric representations stored in the multi-dimensional array. In one example, the process includes determining one or more active areas for the objects, based on the size of the polygons per time interval.

In an implementation, the process includes storing sizes of the geometric representations in the fields of the multi-dimensional array and determining the movement patterns of the objects based on the sizes of the geometric representations. For example, a geometric representation having a smaller size represents less object movement and a geometric representation having a greater size represents more object movement. In one implementation, the process includes determining movement patterns of an object based on analyzing a series of temporally consecutive geometric representations for the object.

In an implementation, the process includes determining an active area for an object based on a size of an area of one or more of the geometric representations, without regard to locational data density. For example, the active area corresponds to a region where the object movement is reduced below a threshold value for at least a predetermined length of time.

In another implementation, the process includes smoothing the data by selecting start times and lengths of the time intervals such that the time intervals overlap.

In one implementation, the process includes displaying the movement patterns via a user interface of a display device.

In various implementations, one or more computer readable storage media (as described above) include computer executable instructions that, when executed by a computer processor, direct the computer processor to perform operations including at least a portion of the process 800.

In alternate implementations, other techniques may be included in the process in various combinations, and remain within the scope of the disclosure.

Although implementations have been described in language specific to structural features and/or methodological acts, it is to be understood that the subject matter defined in the appended claims is not necessarily limited to the specific features or acts described above. Rather, the specific features and acts are disclosed as illustrative forms of illustrative implementations. For example, the methodological acts need not be performed in the order or combinations described herein, and may be performed in any combination of one or more acts.

What is claimed is:

1. Computer-readable storage media, having computer-executable instructions stored thereon, that when executed, cause a computer processor to initiate:
    collecting, via an input/output module, locational data for multiple objects over a duration;
    grouping, via a control module, the locational data according to a plurality of sliding time intervals of variable length, the time intervals comprising portions of the duration;
    converting, via the control module, the locational data into polygons representing the locational data per time interval per object by iteratively processing the locational data via a convex hull algorithm, by object, by time length and by start time, wherein a size or a shape of the polygons represents object movement during a time interval;
    storing, via a storage device, the size of the polygons in fields of a three-dimensional data structure, each field of the data structure corresponding to an object, a start time for the time interval, and a length of the time interval;
    determining, via the control module, movement patterns of the objects based on the size or the shape of the polygons; and
    providing a user interface arranged to display the movement patterns to a user.

2. The computer-readable storage media of claim 1, wherein a value of the time length of the time interval varies with subsequent iterations of time length, based on a desired observation scale or desired level of detail.

3. The computer-readable storage media of claim 1, further comprising storing one or more edge lengths, a number of vertices, and/or a number of edges of the polygons in the fields of the three-dimensional data structure.

4. The computer-readable storage media of claim 1, wherein the locational data comprises a timestamp and a location of a base station that a mobile communication device is connected to, and wherein the objects comprise mobile communication devices.

5. The computer-readable storage media of claim 1, wherein the locational data does not include global positioning satellite (GPS) data or signal triangle information regarding the objects.

6. The computer-readable storage media of claim 1, wherein a length of an edge of a polygon corresponds to a distance traveled by an object during the time interval.

7. A system, comprising:
    an input/output module arranged to receive locational data of an object over a duration of time;
    a control module arranged to
        group the locational data according to a plurality of sliding time intervals of variable length, the time intervals comprising portions of the duration,
        iteratively convert the locational data into one or more geometric representations of the locational data per time interval, the geometric representations representative of the object's movement during each time interval, wherein the geometric representations comprise convex polyhedrons whose vertices comprise at least a portion of the locational data received by the input/output module, and
        determine movement patterns of the object based on properties of the geometric representations;
    a storage device arranged to store one or more properties of the geometric representations in fields of a multi-dimensional array, each field of the array corresponding to the object, a start time for a time interval, and a length of the time interval; and
    a user interface arranged to display the movement patterns to a user.

8. The system of claim 7, wherein the control module is arranged to convert the locational data into one or more geometric representations based on a time interval of a first length, and to convert the locational data into one or more other geometric representations based on time intervals of subsequent lengths, for a set of predetermined lengths.

9. The system of claim 8, wherein the control module is arranged to convert the locational data into one or more geometric representations for the set of predetermined lengths based on a first interval start time, and to convert the locational data into one or more other geometric representations for the set of predetermined lengths based on subsequent interval start times, for a set of predetermined interval start times.

10. The system of claim 9, wherein the control module is arranged to regroup the locational data according to subsequent pluralities of sliding time intervals based on iterations of the set of predetermined lengths and the set of predetermined interval start times.

11. The system of claim 7, wherein the system is arranged to receive locational data for a plurality of objects over the duration of time, to convert the locational data into geometric representations iteratively by object, length of time interval, and start time, and to store one or more properties of the geometric representations in fields of a three dimensional data structure, the three dimensions of the data structure corresponding to an object id, a start time for a time interval, and a length of the time interval.

12. A method of tracking movement of multiple objects, comprising:
   collecting, via an input/output module, locational data for the objects over a duration;
   grouping, via a control module, the locational data according to a plurality of sliding time intervals of variable length, the time intervals comprising portions of the duration;
   converting, via the control module, the locational data into one or more geometric representations of the locational data per time interval per object, the geometric representations representative of object movement during a time interval, wherein the geometric representations comprise convex polyhedrons whose vertices comprise at least a portion of the locational data received by the input/output module;
   storing, via a storage device, one or more properties of the geometric representations in fields of a multi-dimensional array, each field of the array corresponding to an object, a start time for a time interval, and a length of the time interval; and
   determining, via the control module, movement patterns of the objects based on the properties of the geometric representations stored in the multi-dimensional array.

13. The method of claim 12, further comprising storing sizes of the geometric representations in the fields of the multi-dimensional array and determining the movement patterns of the objects based on the sizes of the geometric representations.

14. The method of claim 13, wherein a geometric representation having a smaller size represents less object movement and a geometric representation having a greater size represents more object movement.

15. The method of claim 12, further comprising determining movement patterns of an object based on analyzing a series of temporally consecutive geometric representations for the object.

16. The method of claim 12, further comprising determining an active area for an object based on a size of an area of one or more of the geometric representations, without regard to locational data density, the active area corresponding to a region where the object movement is reduced below a threshold value for at least a predetermined length of time.

17. The method of claim 12, further comprising smoothing the data by selecting start times and lengths of the time intervals such that the time intervals overlap.

18. The method of claim 12, wherein the sliding time intervals have a form of $(t, t+\tau)$, where t represents the start time of the time interval and $(t+\tau)$ represents the length of the time interval, and wherein $\tau$ comprises a variable based on a speed of the objects and/or a frequency of changes in a direction of travel of the objects.

* * * * *